(12) United States Patent
Lin et al.

(10) Patent No.: US 8,010,421 B2
(45) Date of Patent: Aug. 30, 2011

(54) AUTOMATIC INTERNET ACCOUNT AUTHENTICATION SYSTEM AND AUTHENTICATION CARD PRINTER

(75) Inventors: Por-Horng Lin, Hsinchu (TW); Ying-Tsai Hsu, Hsinchu (TW)

(73) Assignee: Handlink Technologies, Inc., Hsinchu (TW)

( * ) Notice: Subject to any disclaimer, the term of this patent is extended or adjusted under 35 U.S.C. 154(b) by 11 days.

(21) Appl. No.: 12/533,420

(22) Filed: Jul. 31, 2009

(65) Prior Publication Data
US 2009/0287586 A1 Nov. 19, 2009

Related U.S. Application Data

(63) Continuation of application No. 10/641,022, filed on Aug. 15, 2003, now abandoned.

(30) Foreign Application Priority Data

Aug. 22, 2002 (TW) .............................. 91213202 U
Jan. 24, 2003 (TW) .............................. 92201440 U

(51) Int. Cl.
*G07F 19/00* (2006.01)
*G06F 15/16* (2006.01)
*G06Q 20/00* (2006.01)
(52) U.S. Cl. ............................. 705/34; 709/229; 705/64
(58) Field of Classification Search .................... 705/26, 705/34, 64; 709/229
See application file for complete search history.

(56) References Cited

U.S. PATENT DOCUMENTS

| 6,804,720 B1* | 10/2004 | Vilander et al. ............. 709/229 |
| 2002/0095454 A1* | 7/2002 | Reed et al. .................... 709/201 |
| 2002/0188510 A1 | 12/2002 | Arias |
| 2003/0079030 A1* | 4/2003 | Cocotis et al. ................ 709/229 |

FOREIGN PATENT DOCUMENTS
WO    WO 00/76249 A1    12/2000

OTHER PUBLICATIONS

TM-T88III User's Manual, Aug. 2001, 32 pages.
PAIR Printout of file wrapper for U.S. Appl. No. 10/641,022.

* cited by examiner

*Primary Examiner* — Alina N Boutah
*Assistant Examiner* — Mark D Fearer
(74) *Attorney, Agent, or Firm* — Patterson Thuente Christensen Pedersen P.A.

(57) ABSTRACT

An automatic account generation system includes an account generator having an IP address and exhibiting an account management function, a printer and at least one apparatus capable of providing wireless Internet access. The Internet user access authentication information can be acquired and printed from the account generator via an input device of the printer. When a user inputs the Internet user access authentication information into a wireless access apparatus, such as a notebook or a PDA equipped with a WLAN card, he or she can automatically access the WLAN where he or she is located. Moreover, the present system is equipped with a payment apparatus that can be connected to the account generator, so that it can accept payment made, whether by cash or by credit card, for getting the Internet user access authentication information.

16 Claims, 5 Drawing Sheets

AUTOMATIC INTERNET ACCOUNT AUTHENTICATION SYSTEM AND AUTHENTICATION CARD PRINTER

RELATED APPLICATION

This application is a continuation of application Ser. No. 10/641,022 filed Aug. 15, 2003, which is hereby fully incorporated herein by reference.

BACKGROUND OF THE INVENTION

1. Field of the Invention

The present invention relates to an automatic account generation system and printer therefor, and more particularly, to a computer network system that can automatically print Internet user access authentication information and enable new users to connect to the Wireless Area Network (WAN) from any place by just entering their Internet user access authentication information.

2. Background of the Related Art

Wireless network technology is becoming widely used, and many enterprises and public buildings, such as international airports, hotels and coffee shops are implementing the technology to provide wireless Internet services to consumers. Users only need to use their own notebook computers or PDAs (Personal Digital Assistants), and rent the wireless network interface card or subscribe to the service to connect to the wireless network. They can then access the Internet world for e-mail, on-line games, personal financial information, news, etc. Thus, network resources can be accessed at any time and from any place.

However, wireless Internet access services are mostly provided by specific Internet service suppliers in such manner that a full package includes hardware and software. Login accounts, passwords and user's configuration data for Internet access are also available for sale at the counters of shops or cybercafes where users frequent. Hence, the outlets offering wireless Internet access services have to share their gains with the Internet service suppliers. In this way, they cannot completely profit from the wireless Internet access services they provide inside their outlets. If small-scale shops install similar wireless area network on their own and maintain the related Internet access services, then these lead to a lot of technological and operating obstacles. In other words, most of the shops do not have enough budget to hire special employees that possess the knowledge and skills in Internet technology required for the maintenance and administration of a wireless Internet access service. Moreover, they are unable to manage the complicated data involved with Internet access and calculate fees according to the on-line time for the wireless Internet access service for users who may go to the shops at any time.

In summary, it is important for Internet service enterprises nowadays to provide a system that can effectively manage wireless Internet access services and increase the competitiveness of Internet access service shops or cybercafes.

SUMMARY OF THE INVENTION

A first objective of the present invention is to provide an automatic account generation system and printer therefor so as to simplify operations regarding Internet services. The automatic account generation system automatically acquires and prints Internet user access authentication information via a printer so that users can access the Internet after the Internet user access authentication information is entered into a computer terminal.

The second objective of the present invention is to provide an automatic account generation system and its printer, both designed to save manpower, so that it can automatically retrieve Internet user access authentication information without the employment of specific people to monitor the utilization of the wireless Internet access services. Therefor, the wireless Internet access service supplier can efficiently operate their Internet services at a lower cost.

The third objective of the present invention is to provide an automatic account generation system that can act on its own so as to enable small-scale shops to maintain and operate the system independently, without being subject to other Internet service suppliers or having to share profits with them.

The fourth objective of the present invention is to provide an automatic account generation system characterized by such diversified fee collection functions that payment may be made by cash or by credit card. In order to achieve the objectives, the present invention discloses an automatic account generation system and printer therefor. The automatic account generation system includes an account generator having an IP address and exhibiting an account management function, a printer and at least one apparatus capable of providing wireless Internet access. Internet user access authentication information can be acquired and printed from the account generator via the touch panel of the input device of the printer. When a user can enter the Internet user access authentication information into a wireless access apparatus, such as a notebook or a PDA equipped with a WLAN (Wireless Local Area Network) card, he or she can automatically access the WLAN wherever he or she is located. Moreover, the present system is equipped with a payment apparatus that can be connected to the account generator, so that it can accept payment made, whether by cash or by credit card, for getting the Internet user access authentication information.

BRIEF DESCRIPTION OF THE DRAWINGS

The invention will be described according to the appended drawings in which.

DESCRIPTION OF THE PREFERRED EMBODIMENT

Figure 1:
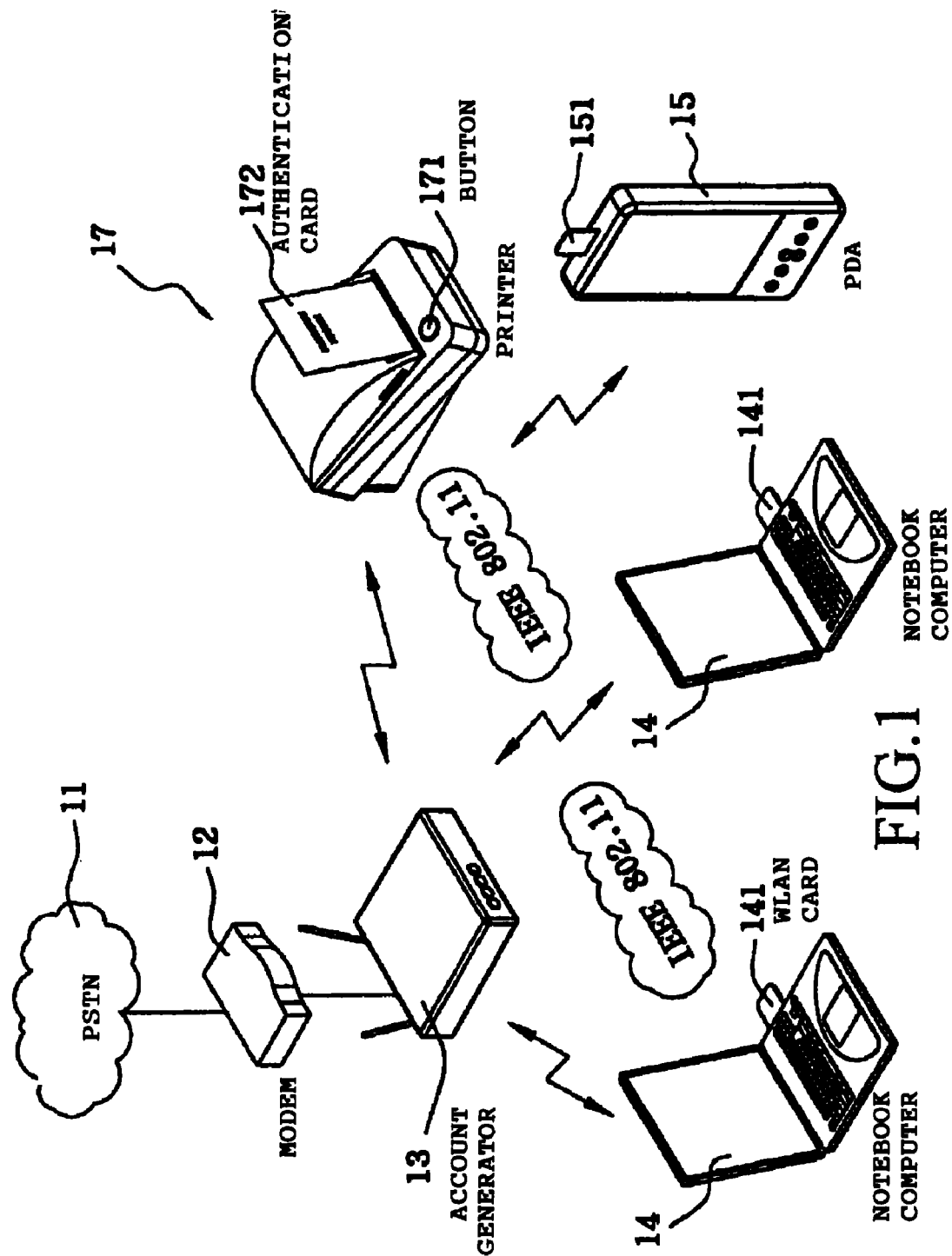
FIG. 1 is a schematic diagram of an automatic account generation system in accordance with the first embodiment of the present invention.

FIG. 1 is a schematic diagram of an automatic account generation system in accordance with the first embodiment of the present invention. The shops and cybercafes, which plan to provide wireless Internet access services, should first apply for lines and accounts to be connected to a WAN (Wide Area Network) outside of their location. In general, the Public Switched Telephone Network (PSTN) 11 is connected via a modem 12 and telephone lines or TV cables. In this way, one can access the Internet to browse all desired web sites in the world or receive, send and read personal electronic mail. We can use an ADSL modem or a cable modem as the modem 12 for broadband communication. An account generator 13 opposite to the PSTN 11 is also connected to the modem 12, and can manage the IP addresses and the accounts of the users. That is, the account generator 13 has a basic function as a gateway, a router, or an access point does, and further has an account management function, generating Internet user access authentication information. When a button 171 on a local printer 17 is depressed, the printer 17 can acquire the Internet user access authentication information from the account generator 13 via wire or wireless transmission and print all this information on an Authentication Card 172. Of course, it is possible to replace the functions of the button 171 with voice control means or a touch panel as an input mechanism.

The printer 17 can be placed at a shop's counter, checkout area or other locations available for easy access. When users want to access the WAN in the shops, they can purchase an Authentication Card 172 from the counter, the Authentication Card 172 is printed with the basic data necessary for a login account, such as username, password, the number of hours to be allocated for wireless Internet access and configuration data. Users only have to enter the data seen on the card onto a confirmation page shown on the screen of a notebook 14 equipped with a WLAN card 141, in order to access the Internet. Wireless data transmission can take place between the notebook 14 and the account generator 13 via standardized telecommunication protocols, such as IEEE 802.11a, IEEE 802.11b and IEEE 802.11g. In addition to the notebook 14, users can also use a PDA (Personal Digital Assistant) 15 plugged with a wireless LAN card 151 or a variety of apparatus capable of accessing the WLAN. From the above-mentioned, a clerk at the counter does not have to master Internet techniques, but only has to inquire the users about the amount of on-line time for Internet access and depress the button 171 on the printer 17 to get the Authentication Card 172 for the users. Once the users obtain the Authentication Card 172, they can take any seat they like and enter their usernames or passwords onto a confirmation page shown on the screen of a wireless access apparatus and enjoy surfing on the Web.

Figure 2:
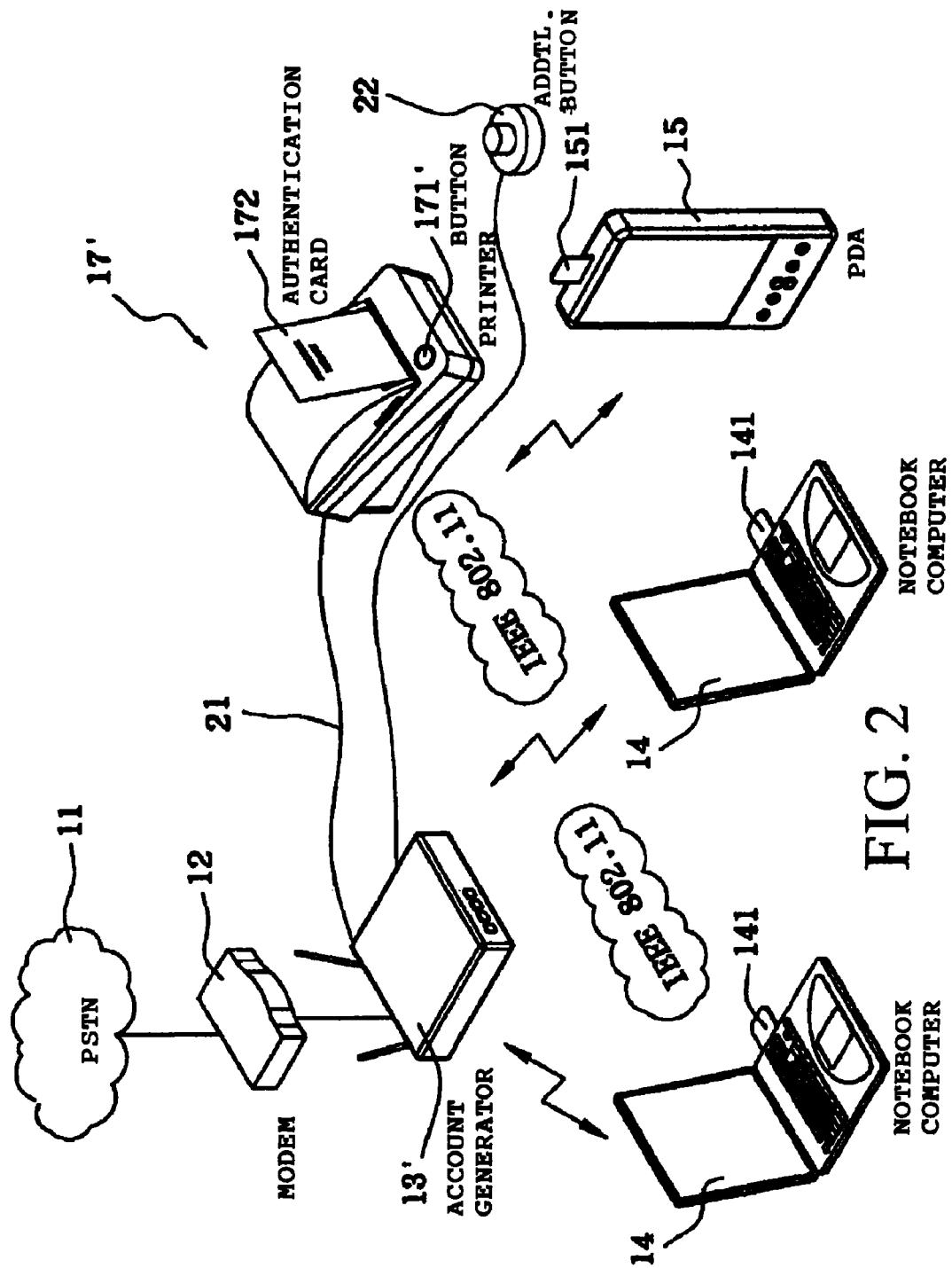
FIG. 2 is a schematic diagram of an automatic account generation system in accordance with the second embodiment of the present invention.

As shown in FIG. 1, the printer 17 acquires the Internet user access authentication information from the account generator 13 via wireless transmission. However, data transfer can also be provided via cables in practical applications. As shown in FIG. 2, a printer 17' is connected to the account generator 13 via a signal line 21. Users can depress the button 171' on the printer 17' to acquire the Authentication Card 172. Additionally, at least one separate button 22 may be installed beside a service clerk to enhance the flexibility of the service clerk's work. The separate button 22 is directly connected to the account generator 13'. If the separate button 22 is depressed, the printer 17' will print a User Authentication Card 172. Moreover, users can also take the User Authentication card 172 from the place where the printers 17 are on their own.

Figure 3:
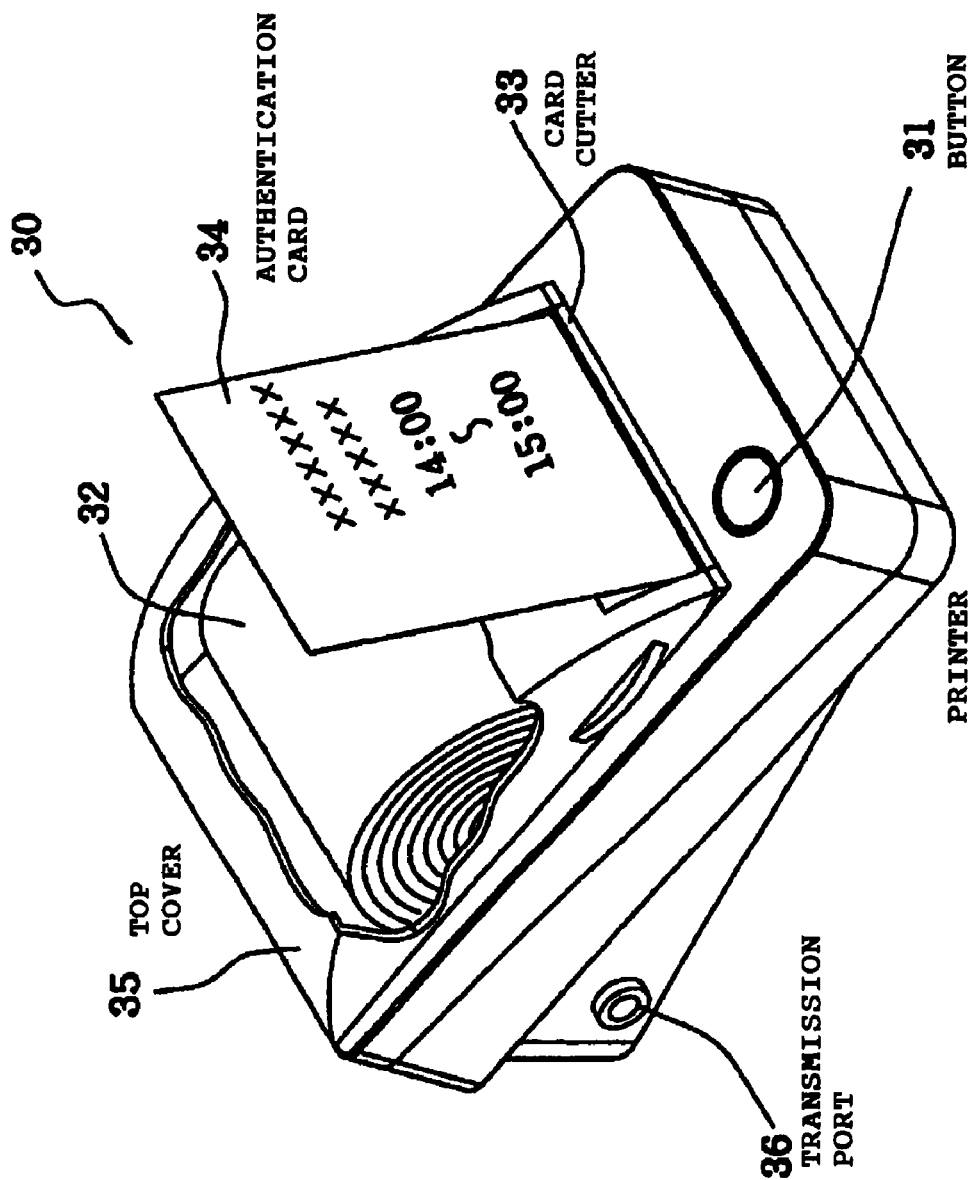
FIG. 3 is a perspective diagram of the printer in accordance with the present invention.

FIG. 3 is a perspective diagram of the printer employed by the automatic account generation system of the present invention. The printer 30 has at least a button 31 available for operations and setting related functions. A paper roll 32 is placed inside a top protecting cover 35 for Internet user access authentication information to be printed thereon. After the information has been printed out, one separate User Authentication Card 34 may be cut from the printout by a cutter 33. A signal transmission port 36 is installed on one side of the printer 30 for transferring the Internet user access authentication information from an account generator, and works by means of the signal line 21 (shown in FIG. 2) or wireless transmission means. However, the present invention may also adopt wireless transfer. As mentioned previously, the printer 30 can be connected to the account generator 13 and the account generator 13' via wireless transmission or a signal transmission line. The wireless transmission not only adopts the protocol commonly used in WAN, such as IEEE 802.11a, 802.11b (WiFi) and IEEE 802.11g, but it also employs a variety of techniques like IrDA (Infrared Data Association), radio frequency transmission or Bluetooth transmission. On the other hand, the signal line connects the printer 30 and the account generator by way of an Ethernet port, a serial port, a parallel port, a USB port, or an IEEE 1394 port.

Figure 4:
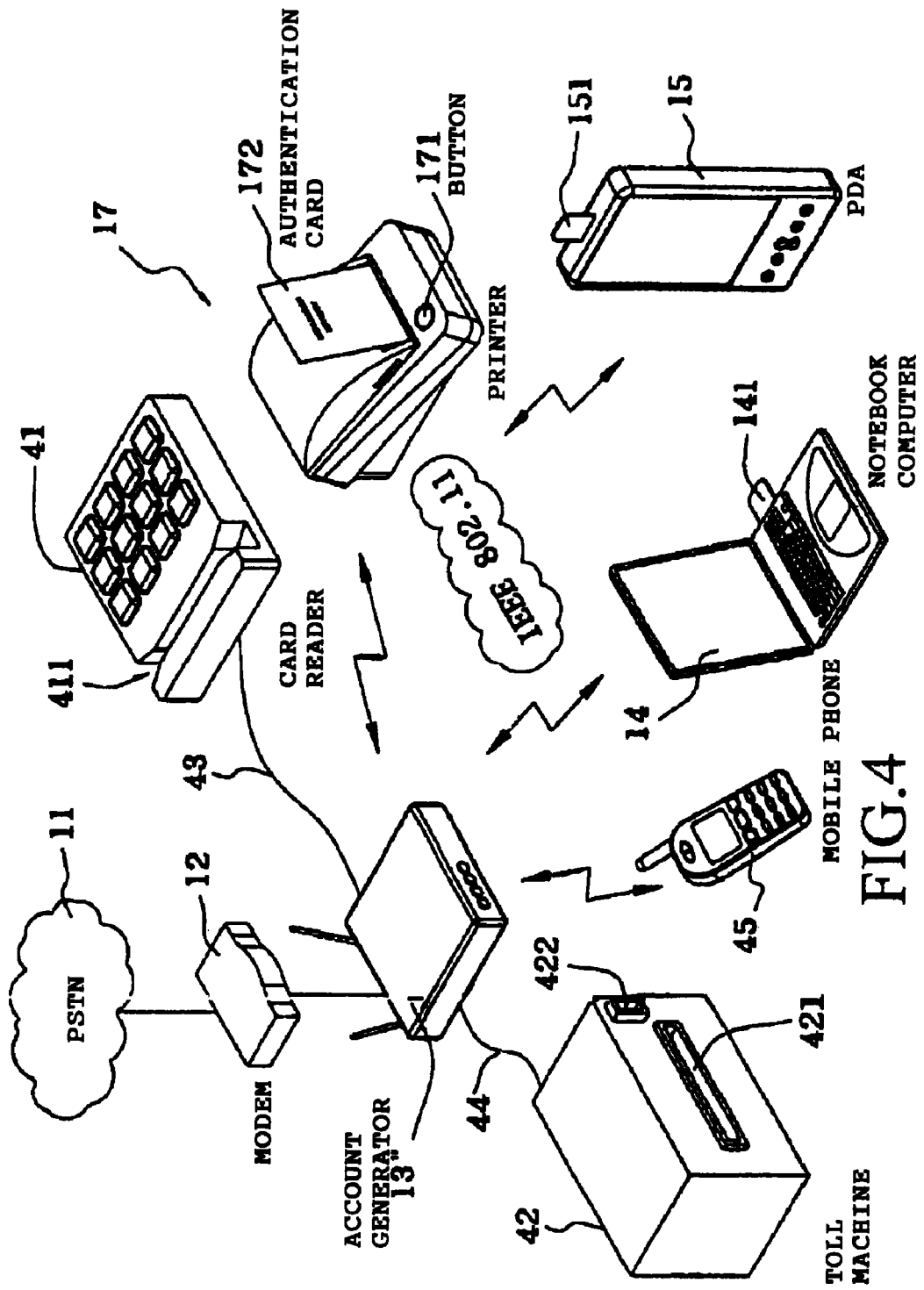
FIG. 4 is a schematic diagram of an automatic account generation system in accordance with the third embodiment of the present invention.

Considering the design for diversified payment functions, the present invention provides both a cash payment mode and a non-cash payment mode and replaces a clerk's manual operation with a self-service operation. FIG. 4 is a schematic diagram of the third embodiment of the hotspot system in accordance with the present invention. It involves separately connecting a card reader 41 and a toll machine 42 to the account generator 13" by means of connection lines 43 and 44. When a user inserts his or her credit card into a swiping slot 411 and completes a corresponding confirmation, the account generator 13" will acquire the information about this payment confirmation and then order the printer 17 to print out the User Authentication Card 172 with reference to the amount of money paid for the wireless Internet access services. Likewise, when users put bank notes into a note slot 421 of the toll machine 42, or put a sufficient amount of coins into a coin-operated slot 422, then the account generator 13" will acquire the confirmation of payment. Finally the users can obtain the User Authentication Card 172 listing the amount of on-line time commensurate with the payment.

Recently, some telecommunications suppliers and automatic machine suppliers propose a kind of technique that enables a user to make payment with a mobile phone. The present invention adopts the same technique for dialing up a mobile phone 45 to pay the bill of wireless Internet services, and then telecommunication systems tell the account generator 13" the confirmation of payment and allowing the User Authentication Card 172 to be printed out.

Figure 5:
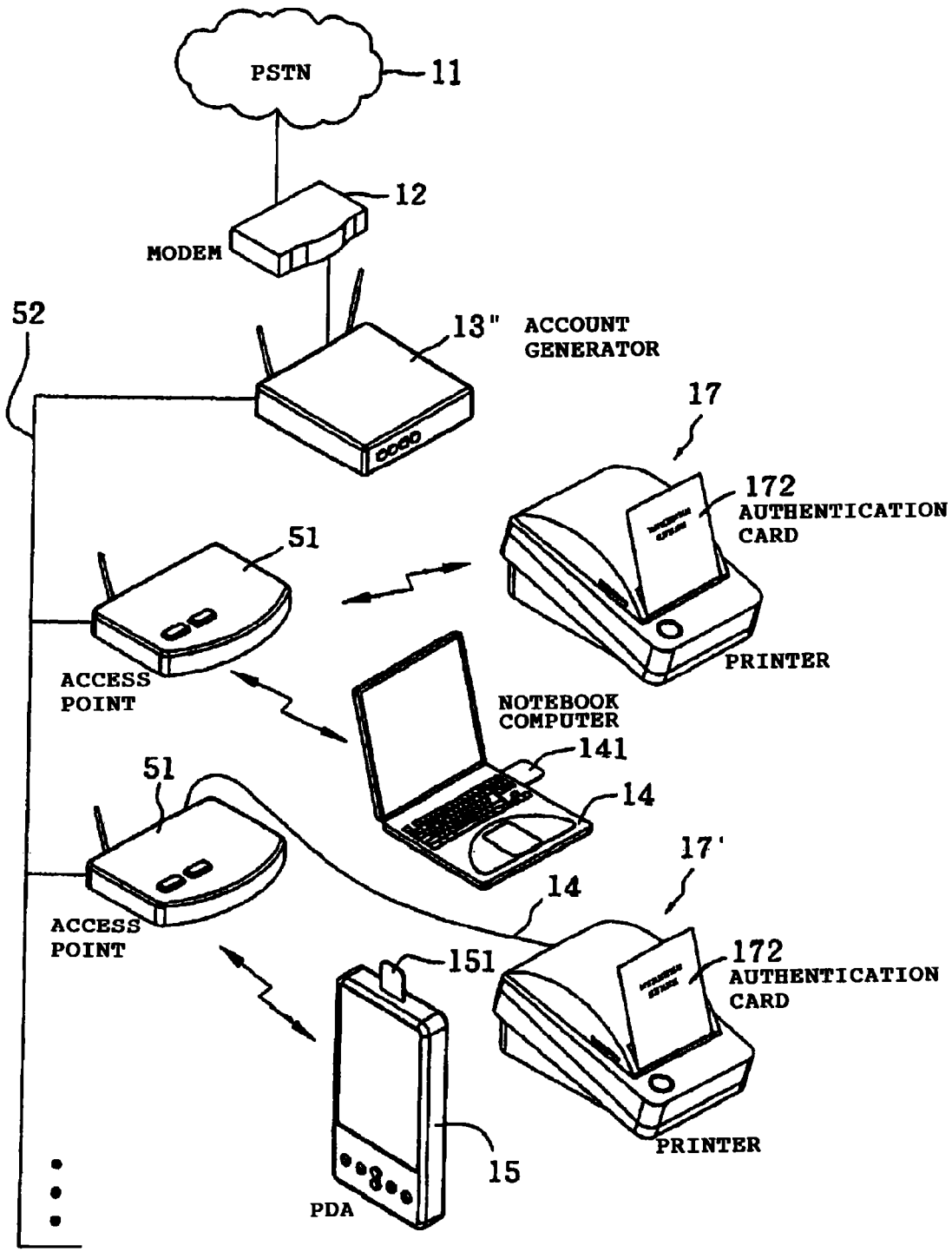
FIG. 5 is a schematic diagram of an automatic account generation system in accordance with the fourth embodiment of the present invention.

As shown in FIG. 5, the account generator 13" can also be connected to a plurality of access points 51 via the connection line 52. Various access points 51 can be placed at different locations or floors of a building. Each location and floor of the building is equipped with a printer 17 or a printer 17', and thus it is convenient for users to access and acquire the User Authentication Cards 172. Consequently, if users need to extend the amount of on-line time allocated for wireless Internet access, then it is not necessary for them to obtain the cards from the counter of the original entrance again, making the entire operating procedure simpler and easier.

The above-described embodiments of the present invention are intended to be illustrative only. Numerous alternative embodiments may be devised by persons skilled in the art without departing from the scope of the following claims.

What is claimed is:

1. An automatic account generation system, comprising:
   an account generator connected to an external WAN, the account generator having an IP address and performing account management functions, including generation and transmission of Internet user access authentication information;
   an input device communicatively coupled to the account generator, wherein upon activation, the input device requests generation of Internet user access authentication information from the account generator;

a printer communicatively coupled to the account generator; and at least one account-charging apparatus operatively connected to the account generator, the account-charging apparatus being at least one of a card reader and a toll machine, wherein the account generator is further configured to connect to a wireless access apparatus and allow the wireless access apparatus access to the WAN upon receipt of the Internet user access authentication information from the wireless access apparatus, the input device is mounted on the printer, the printer is connected to the account generator via a signal transmission port of the printer, and the account generator instructs the printer to print out the Internet user access authentication information after confirming payment information from the account-charging apparatus.

2. The automatic account generation system of claim 1, wherein the account generator includes a gateway, a router, or an access point.

3. The automatic account generation system of claim 1, wherein the input device is at least one of a button and a touch panel.

4. The automatic account generation system of claim 1, wherein the printer is adapted to receive the Internet user access authentication information from the account generator via a wireless transmission.

5. The automatic account generation system of claim 4, wherein the wireless transmission adopts a wireless communication protocol of IEEE 802.11a, IEEE 802.11b, IEEE 802.11g, IrDA, radio frequency, or Bluetooth.

6. The automatic account generation system of claim 1, wherein the printer is communicatively coupled to the account generator by an Ethernet port, a series port, a parallel port, a USB port, or an IEEE 1394 port for receiving the Internet user access authentication information.

7. The automatic account generation system of claim 1, wherein the Internet user access authentication information includes a username, a password, and an on-line usage time.

8. The automatic account generation system of claim 1, wherein the Internet user access authentication information includes a username, a password, and an on-line usage time.

9. The automatic account generation system of claim 1, wherein the account-charging apparatus is a mobile phone.

10. The automatic account generation system of claim 1, wherein the input device is a voice controller.

11. A printer suitable for use in an automatic account generation system for receiving and printing out Internet user access authentication information, the printer comprising:

an input device operably coupled to the printer and adapted to be activated to request Internet user access authentication information from the automatic account generation system;

a signal transmission port for receiving Internet user access authentication information transmitted from the automatic account generation system; and a paper roll for recording the Internet user access authentication information, wherein the printer is connected to the automatic account generation system via the signal transmission port, and wherein transmissions to and from the printer occur in response to the input device being activated and provides the Internet user access authentication information that allows access to the WLAN from wherever a user is located.

12. The printer of claim 11, further comprising a cutter for cutting the paper roll.

13. The printer of claim 11, wherein the signal transmission port is adapted to acquire the Internet user access authentication information via a wireless transmission.

14. The printer of claim 13, wherein the wireless transmission adopts a wireless communication protocol of IEEE 802.11a, IEEE 802.11b, IEEE 802.11g, IrDA, radio frequency, or Bluetooth.

15. The printer of claim 11, wherein the signal transmission port is an Ethernet port, a series port, a parallel port, a USB port, or an IEEE 1394 port.

16. The printer of claim 11, wherein the input device is selected from the group consisting of a button, a voice-activated controller, and a touch panel.

\* \* \* \* \*